United States Patent
Xi et al.

(10) Patent No.: US 10,707,027 B2
(45) Date of Patent: Jul. 7, 2020

(54) FORMULATIONS FOR AND METHODS OF FABRICATING ENERGY STORAGE DEVICE ELECTRODES

(71) Applicant: MAXWELL TECHNOLOGIES, INC., San Diego, CA (US)

(72) Inventors: Xiaomei Xi, Carlsbad, CA (US); Santhanam Raman, San Diego, CA (US)

(73) Assignee: Maxwell Technologies, Inc., San Diego, CA (US)

(*) Notice: Subject to any disclaimer, the term of this patent is extended or adjusted under 35 U.S.C. 154(b) by 0 days.

(21) Appl. No.: 16/201,715

(22) Filed: Nov. 27, 2018

(65) Prior Publication Data
US 2019/0096593 A1    Mar. 28, 2019

Related U.S. Application Data

(62) Division of application No. 14/680,834, filed on Apr. 7, 2015, now Pat. No. 10,153,096.
(Continued)

(51) Int. Cl.
*H01G 11/38* (2013.01)
*H01G 11/86* (2013.01)
(Continued)

(52) U.S. Cl.
CPC .............. *H01G 11/38* (2013.01); *H01G 11/06* (2013.01); *H01G 11/50* (2013.01); *H01G 11/86* (2013.01);
(Continued)

(58) Field of Classification Search
CPC ....... H01G 11/38; H01G 11/50; H01M 4/133; H01M 4/364
See application file for complete search history.

(56) References Cited

U.S. PATENT DOCUMENTS 7,697,264 B2    4/2010    Tasaki et al.
7,733,629 B2    6/2010    Tasaki et al.
(Continued)

FOREIGN PATENT DOCUMENTS

CN    1349672 A    5/2002
CN    1949561 A    4/2007
(Continued)

*Primary Examiner* — James M Erwin
(74) *Attorney, Agent, or Firm* — Knobbe, Martens, Olson & Bear, LLP

(57) ABSTRACT

An energy storage device can include a cathode, an anode, and a separator between the cathode and the anode, where the anode comprises a first lithium ion intercalating carbon component and a second lithium ion intercalating carbon component. The first lithium ion intercalating carbon component can include hard carbon, and the second lithium ion intercalating component can include graphite or soft carbon. A ratio of the hard carbon to the graphite or of the hard carbon to the soft carbon can be between 1:19 to 19:1. The anode may comprise a first lithium ion intercalating carbon component, a second lithium ion intercalating carbon component and a third lithium ion intercalating carbon component. The first lithium ion intercalating carbon component can include hard carbon, the second lithium ion intercalating carbon component can include soft carbon, and the third lithium ion intercalating carbon component can include graphite.

28 Claims, 11 Drawing Sheets

Related U.S. Application Data

(60) Provisional application No. 61/976,977, filed on Apr. 8, 2014.

(51) Int. Cl.
| | | |
|---|---|---|
| *H01G 11/06* | (2013.01) | |
| *H01G 11/50* | (2013.01) | |
| *H01M 4/587* | (2010.01) | |
| *H01M 4/133* | (2010.01) | |
| *H01M 4/36* | (2006.01) | |
| *H01M 4/62* | (2006.01) | |
| *H01M 10/0525* | (2010.01) | |

(52) U.S. Cl.
CPC ........... *H01M 4/133* (2013.01); *H01M 4/364* (2013.01); *H01M 4/587* (2013.01); *H01M 4/621* (2013.01); *H01M 10/0525* (2013.01); *Y02E 60/13* (2013.01); *Y10T 29/43* (2015.01)

(56) References Cited

U.S. PATENT DOCUMENTS

| | | |
|---|---|---|
| 7,817,403 B2 | 10/2010 | Tasaki et al. |
| 9,525,168 B2 | 12/2016 | Mitchell et al. |
| 2007/0122698 A1 | 5/2007 | Mitchell et al. |
| 2010/0119699 A1* | 5/2010 | Zhong .................... H01G 9/155 427/79 |
| 2010/0120179 A1 | 5/2010 | Zhamu et al. |
| 2012/0050953 A1 | 3/2012 | Lee et al. |
| 2013/0230777 A1 | 9/2013 | Babic et al. |
| 2013/0309577 A1 | 11/2013 | Hayashi et al. |

FOREIGN PATENT DOCUMENTS

| | | |
|---|---|---|
| CN | 101901906 A | 12/2010 |
| CN | 103021671 | 4/2013 |
| CN | 103427082 | 12/2013 |
| EP | 1207571 | 5/2002 |
| EP | 1903628 | 3/2008 |
| JP | 2012151395 | 8/2012 |
| WO | WO 9733327 | 9/1997 |

\* cited by examiner

|  | Cap (F) | ESR (ohm) | Carbon composition |
| --- | --- | --- | --- |
| LiC-1 | 17.92 | 0.38 | Hard carbon |
| LiC-2 | 17.46 | 0.41 | Hard carbon |
| LiC-3 | 17.35 | 0.40 | Hard carbon |
| LiC-4 | 17.32 | 0.41 | Hard carbon |
| Ave | 17.51 | 0.40 | |
| LiC-1 | 18.82 | 0.28 | Soft carbon:hard carbon 1:1 |
| LiC-3 | 18.73 | 0.31 | Soft carbon:hard carbon 1:1 |
| LiC-4 | 18.60 | 0.32 | Soft carbon:hard carbon 1:1 |
| LiC-5 | 18.17 | 0.31 | Soft carbon:hard carbon 1:1 |
| Ave | 18.58 | 0.31 | |

FIG. 3

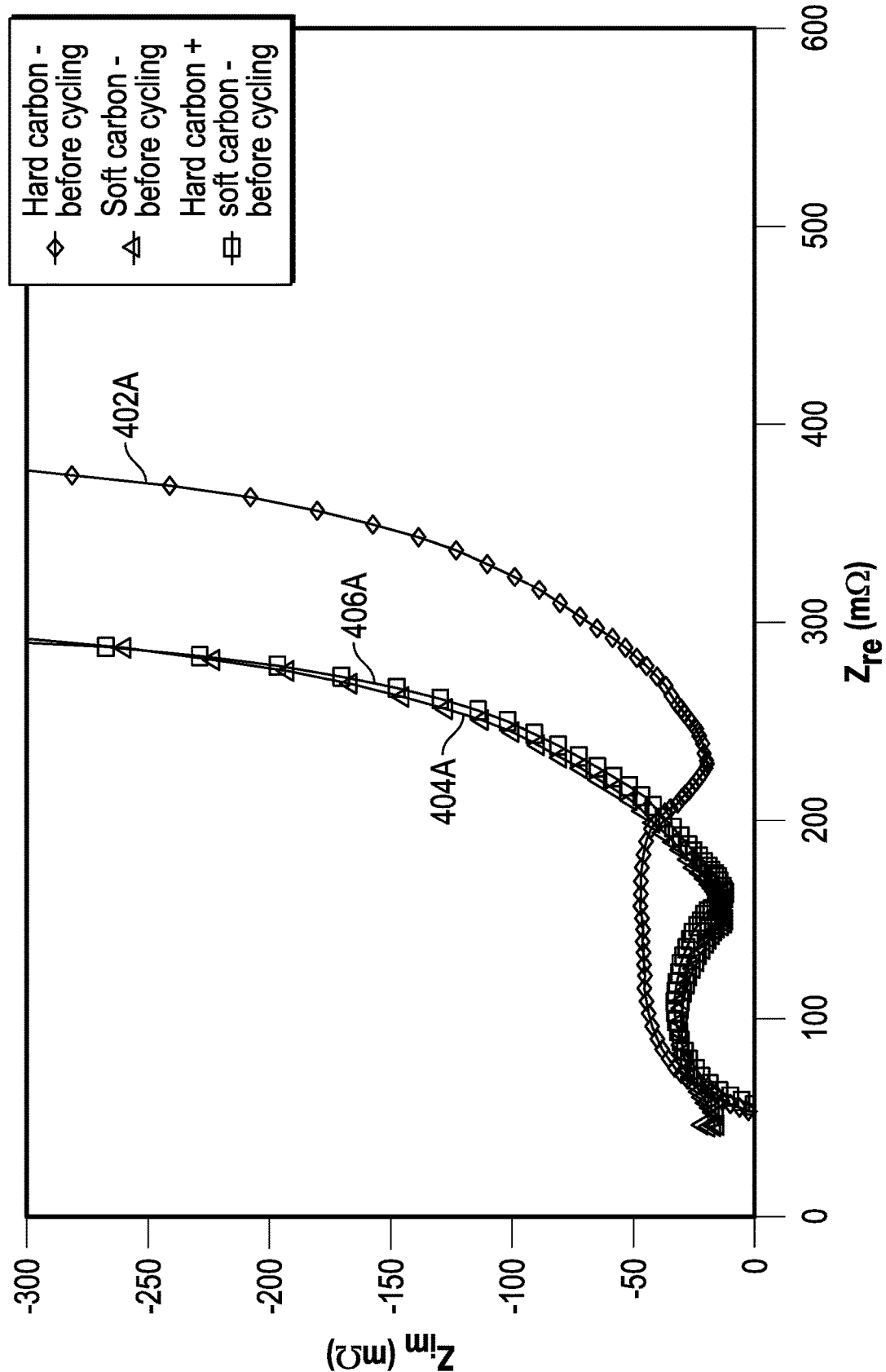

|  | Cap (F) | ESR (ohm) | Carbon composition |
|---|---|---|---|
| LiC-2 | 16.58 | 0.46 | Hard carbon |
| LiC-3 | 16.97 | 0.39 | Hard carbon |
| LiC-4 | 16.94 | 0.36 | Hard carbon |
| LiC-5 | 17.08 | 0.39 | Hard carbon |
| Ave | 16.89 | 0.40 | |
| LiC-6 | 17.05 | 0.38 | Graphite + hard carbon 1:1 |
| LiC-9 | 15.96 | 0.41 | Graphite + hard carbon 1:1 |
| LiC-10 | 17.17 | 0.33 | Graphite + hard carbon 1:1 |
| LiC-11 | 16.11 | 0.33 | Graphite + hard carbon 1:1 |
| LiC-12 | 17.29 | 0.32 | Graphite + hard carbon 1:1 |
| LiC-13 | 16.93 | 0.32 | Graphite + hard carbon 1:1 |
| LiC-14 | 16.90 | 0.34 | Graphite + hard carbon 1:1 |
| LiC-15 | 16.36 | 0.34 | Graphite + hard carbon 1:1 |
| Ave | 16.72 | 0.35 | |

FIG. 6

|        | Cap (F) | ESR (ohm) | Carbon composition |
|--------|---------|-----------|--------------------|
| LiC-1  | 17.92   | 0.38      | Hard carbon        |
| LiC-2  | 17.46   | 0.41      | Hard carbon        |
| LiC-3  | 17.35   | 0.40      | Hard carbon        |
| LiC-4  | 17.32   | 0.41      | Hard carbon        |
| Ave    | 17.51 | 0.40  |                    |
| LiC-8  | 18.45   | 0.34      | Soft carbon:hard carbon 90:10 |
| LiC-9  | 18.53   | 0.30      | Soft carbon:hard carbon 90:10 |
| LiC-11 | 18.75   | 0.28      | Soft carbon:hard carbon 90:10 |
| LiC-12 | 18.40   | 0.34      | Soft carbon:hard carbon 90:10 |
| LiC-13 | 18.81   | 0.30      | Soft carbon:hard carbon 90:10 |
| LiC-14 | 18.50   | 0.31      | Soft carbon:hard carbon 90:10 |
| LiC-15 | 18.83   | 0.29      | Soft carbon:hard carbon 90:10 |
| Ave    | 18.61 | 0.31  |                    |
| LiC-7  | 18.58   | 0.32      | Soft carbon:hard carbon 10:90 |
| LiC-8  | 18.36   | 0.34      | Soft carbon:hard carbon 10:90 |
| LiC-9  | 18.27   | 0.35      | Soft carbon:hard carbon 10:90 |
| LiC-10 | 18.40   | 0.31      | Soft carbon:hard carbon 10:90 |
| LiC-12 | 18.71   | 0.32      | Soft carbon:hard carbon 10:90 |
| LiC-13 | 18.33   | 0.32      | Soft carbon:hard carbon 10:90 |
| LiC-14 | 18.56   | 0.32      | Soft carbon:hard carbon 10:90 |
| Ave    | 18.46 | 0.33  |                    |

FIG. 8

| | Cap (F) | ESR (ohm) | Carbon composition |
|---|---|---|---|
| LiC-1 | 17.92 | 0.38 | Hard carbon |
| LiC-2 | 17.46 | 0.41 | Hard carbon |
| LiC-3 | 17.35 | 0.40 | Hard carbon |
| LiC-4 | 17.32 | 0.41 | Hard carbon |
| Ave | 17.51 | 0.40 | |
| LiC-6 | 18.51 | 0.31 | Soft carbon:hard carbon 70:30 |
| LiC-7 | 18.43 | 0.33 | Soft carbon:hard carbon 70:30 |
| LiC-8 | 18.45 | 0.33 | Soft carbon:hard carbon 70:30 |
| LiC-9 | 18.13 | 0.35 | Soft carbon:hard carbon 70:30 |
| LiC-10 | 17.92 | 0.36 | Soft carbon:hard carbon 70:30 |
| LiC-11 | 18.45 | 0.31 | Soft carbon:hard carbon 70:30 |
| LiC-12 | 17.77 | 0.34 | Soft carbon:hard carbon 70:30 |
| LiC-13 | 18.46 | 0.32 | Soft carbon:hard carbon 70:30 |
| LiC-15 | 17.76 | 0.32 | Soft carbon:hard carbon 70:30 |
| Ave | 18.21 | 0.33 | |

FIG. 9

|  | Cap (F) | ESR (ohm) | Carbon composition |
|---|---|---|---|
| LiC-2 | 16.27 | 0.52 | Hard carbon |
| LiC-3 | 16.71 | 0.54 | Hard carbon |
| LiC-5 | 16.77 | 0.49 | Hard carbon |
| Ave | 16.58 | 0.52 | |
| LiC-6 | 18.27 | 0.34 | Hard carbon/soft carbon/graphite 1:1:1 |
| LiC-7 | 17.82 | 0.37 | Hard carbon/soft carbon/graphite 1:1:1 |
| LiC-8 | 17.56 | 0.39 | Hard carbon/soft carbon/graphite 1:1:1 |
| LiC-9 | 18.14 | 0.34 | Hard carbon/soft carbon/graphite 1:1:1 |
| LiC-10 | 18.36 | 0.34 | Hard carbon/soft carbon/graphite 1:1:1 |
| LiC-11 | 18.04 | 0.35 | Hard carbon/soft carbon/graphite 1:1:1 |
| LiC-12 | 17.91 | 0.32 | Hard carbon/soft carbon/graphite 1:1:1 |
| LiC-13 | 17.79 | 0.39 | Hard carbon/soft carbon/graphite 1:1:1 |
| LiC-14 | 18.06 | 0.35 | Hard carbon/soft carbon/graphite 1:1:1 |
| LiC-15 | 18.29 | 0.35 | Hard carbon/soft carbon/graphite 1:1:1 |
| Ave | 18.02 | 0.35 | |

FIG. 10

FORMULATIONS FOR AND METHODS OF FABRICATING ENERGY STORAGE DEVICE ELECTRODES

CROSS-REFERENCE TO RELATED APPLICATIONS

This application is a divisional of U.S. patent application Ser. No. 14/680,834, filed Apr. 7, 2015, entitled "FORMULATIONS FOR AND METHODS OF FABRICATING ENERGY STORAGE DEVICE ELECTRODES," which claims the benefit of U.S. Provisional Patent Application No. 61/976,977, filed Apr. 8, 2014, entitled "FORMULATIONS FOR AND METHODS OF FABRICATING ENERGY STORAGE DEVICE ELECTRODES," both the disclosures of which are incorporated herein by reference in their entireties.

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present invention relates to energy storage devices, particularly to composition of and methods for fabricating energy storage device electrodes.

Description of the Related Art

Various types of energy storage devices can be used to power electronic devices, including for example, capacitors, batteries, capacitor-battery hybrids and/or fuel cells. An energy storage device, such as a lithium ion capacitor, having an electrode prepared using an improved electrode formulation and/or fabrication process can facilitate improved capacitor electrical performance. A lithium ion capacitor having an electrode prepared using an improved electrode formulation and/or fabrication process may demonstrate improved cycling performance, reduced equivalent series resistance (ESR) values, increased power density performance and/or increased energy density performance. Improved electrode formulations and/or fabrication processes may also facilitate lower costs of energy storage device fabrication.

SUMMARY

Embodiments include an energy storage device including a cathode, an anode and a separator between the cathode and the anode. The anode may include a first lithium ion intercalating carbon component and a second lithium ion intercalating carbon component.

In some embodiments, the energy storage device can include a lithium ion capacitor. In some embodiments, the energy storage device can include an anode and a cathode for a lithium ion battery.

In some embodiments, the first lithium ion intercalating carbon component can be a hard carbon. In some embodiments, the second lithium ion intercalating carbon component can be a soft carbon or graphite.

The energy storage device can include a third lithium ion intercalating carbon component. In some embodiments, the third lithium ion intercalating carbon component can be the other of the soft carbon or the graphite.

In some embodiments, the anode can include the first lithium ion intercalating carbon component and the second lithium ion intercalating carbon component at a ratio of about 1:19 to about 19:1. In some embodiments, the ratio is about 1:1. In some embodiments, the anode comprises about 80 weight % to about 97 weight % of the first lithium ion intercalating carbon component and the second lithium ion intercalating carbon component.

In some embodiments, the anode of the energy storage device can include a conductive additive configured to improve electrical conductivity of the energy storage device.

Embodiments include an anode of an energy storage device, where the anode can include a first lithium ion intercalating carbon component and a second lithium ion intercalating carbon component.

In some embodiments, the energy storage device can include a lithium ion capacitor.

In some embodiments, the first lithium ion intercalating carbon component can be a hard carbon. In some embodiments, the second lithium ion intercalating carbon component can be a soft carbon or graphite.

The anode can include a third lithium ion intercalating carbon component.

In some embodiments, the anode can include the first lithium ion intercalating carbon component and the second lithium ion intercalating carbon component at a ratio of about 1:19 to about 19:1. In some embodiments, the anode can include about 80 weight % to about 97 weight % of the combined first lithium ion intercalating carbon component and the second lithium ion intercalating carbon component.

Embodiments include a method of fabricating an energy storage device, where the method can include providing a first lithium ion intercalating carbon component, providing a second lithium ion intercalating carbon component, providing a fibrillizable binder component and combining the fibrillizable binder component, the first lithium ion intercalating carbon component and the second lithium ion intercalating carbon component to provide an electrode film mixture for forming an electrode.

In some embodiments, the first lithium ion intercalating carbon component can be a hard carbon and the second lithium ion intercalating carbon component can be a soft carbon or a graphite. In some embodiments, the second lithium ion intercalating carbon component can be the soft carbon and the electrode film mixture can include the hard carbon and the soft carbon at a ratio of about 1:1.

In some embodiments, the method can include providing a third lithium ion intercalating carbon component, where the third lithium ion intercalating carbon component can be a graphite.

In some embodiments, the electrode mixture can include about 80 weight % to about 97 weight % of the first lithium ion intercalating carbon component, the second lithium ion intercalating carbon component and the third lithium ion intercalating carbon component.

In some embodiments, the method can include fibrillizing the fibrillizable binder component to provide an electrode mixture comprising fibrillized binder component and the first lithium ion intercalating carbon component and the second lithium ion intercalating carbon component. In some embodiments, the method can include compressing the electrode film mixture comprising the fibrillized binder component and the first lithium ion intercalating carbon component and the second lithium ion intercalating carbon component to form an electrode film.

In some embodiments, the method can include providing a conductive carbon component, and combining the conductive carbon component with the fibrillizable binder component, the first lithium ion intercalating carbon component and the second lithium ion intercalating carbon component to provide the electrode film mixture.

In some embodiments, the energy storage device can include a lithium ion capacitor and the electrode can include an anode of the lithium ion capacitor.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

These and other features, aspects, and advantages of the present disclosure are described with reference to the drawings of certain embodiments, which are intended to illustrate certain embodiments and not to limit the invention.

FIG. 3 is a table listing capacitances and equivalent series resistance (ESR) performances of examples of energy storage devices.

FIGS. 4A and 4B show electrochemical impedance spectroscopy performances of examples of energy storage devices.

FIG. 6 is a table listing capacitances and equivalent series resistance (ESR) performances of examples of energy storage devices.

FIG. 8 is table listing capacitances and equivalent series resistance (ESR) performances of examples of energy storage devices.

FIG. 9 is table listing capacitances and equivalent series resistance (ESR) performances of examples of energy storage devices.

FIG. 10 is table listing capacitances and equivalent series resistance (ESR) performances of examples of energy storage devices.

DETAILED DESCRIPTION

Figure 1:
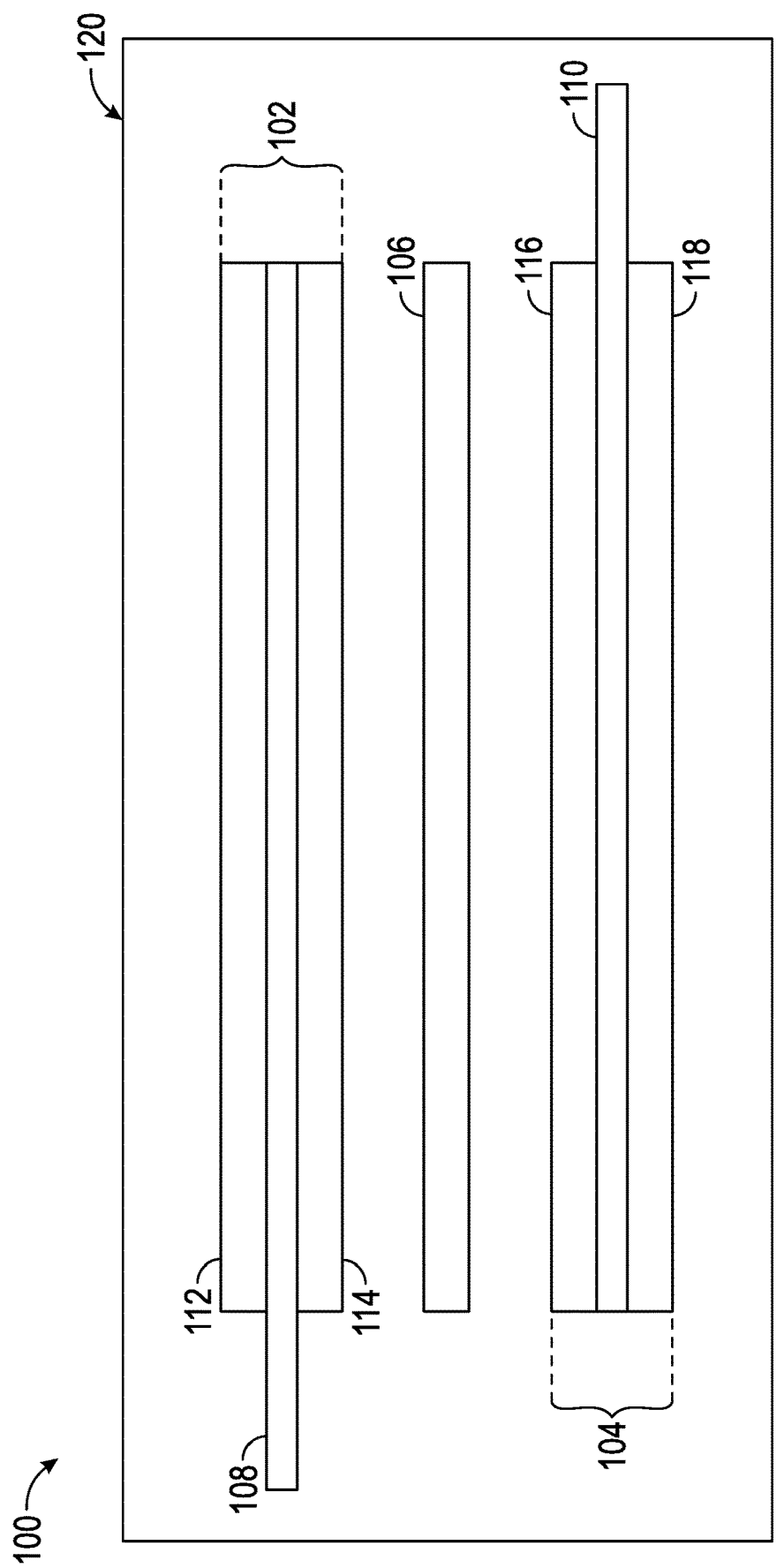
FIG. 1 shows a side cross-sectional schematic view of an example of an energy storage device, according to one embodiment.

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

In some embodiments, an energy storage device, such as a lithium ion capacitor (LiC), with improved electrical performance characteristics is provided. In some embodiments, the lithium ion capacitor can have an anode comprising two lithium ion intercalating carbon components, such as a first lithium ion intercalating carbon component and an additional second lithium ion intercalating carbon component which is a different material from the first lithium intercalating carbon component. For example, the first lithium intercalating carbon component can be hard carbon. The second lithium ion intercalating carbon component may be a soft carbon or a graphite. In another embodiment, the lithium ion capacitor can have an anode prepared using three lithium ion intercalating carbon components. For example, the anode may comprise a hard carbon as a first lithium ion intercalating carbon component, soft carbon as a second lithium ion intercalating carbon component, and graphite as a third lithium ion intercalating carbon component. In some embodiments, the lithium ion capacitor anode can include more than three lithium ion intercalating carbon components.

An anode having two lithium ion intercalating carbon components may be prepared using various ratios of the two lithium ion intercalating carbon components with respect to each other. For example, the anode may comprise the two lithium ion intercalating carbon components at a ratio of about 1:9 to about 9:1. In one embodiment, the ratio can be about 1:1. In one embodiment, the ratio can be about 7:3 or about 3:7. An anode having three lithium ion intercalating carbon components may be prepared using various ratios of the three lithium ion intercalating carbon components with respect to each other. For example, the anode may comprise the three lithium ion intercalating carbon components having a ratio about 1:1:1.

As used herein, soft carbon is a term of art that refers to carbon material formed from a graphitizable carbon precursor which melts before becoming pyrolyzed when subjected to a pyrolysis process. For example, soft carbon refers to carbon material comprising graphitic structure, where the graphitic structure was formed by subjecting the graphitizable carbon precursor material to an elevated temperature, such as a temperature of about 600° C. to about 2,500° C., without or substantially without exposure to oxygen. The graphitizable carbon precursor may melt, or exhibit a fluid phase, at temperatures of about 200° C. to about 500° C., as the carbon precursor is heated to temperatures of about 600° C. to about 2,500° C. during the pyrolysis process. Soft carbon may exhibit graphitic structure having shorter long-range structural order than graphite (e.g., natural graphite or synthetic graphite). In some embodiments, soft carbon can include one or more of carbon materials formed from petroleum coke and/or anthracene.

As used herein, hard carbon is a term of art that refers to carbon material formed from a non-graphitizable carbon precursor, which chars as the precursor becomes pyrolyzed when subjected to a pyrolysis process. For example, hard carbon refers to carbon material which does not exhibit graphitic structure and was formed from non-graphitizable carbon precursor which was exposed to an elevated temperature, such as a temperature of about 600° C. to about 2,500° C., in the absence or substantial absence of oxygen.

In some embodiments, hard carbon can include one or more of carbon materials formed from petroleum pitch and/or sucrose.

As used herein, graphite is a term of art that refers to a number of naturally occurring and/or a synthetic graphite. In some embodiments, naturally occurring graphite can include flake graphite and/or highly oriented pyrolytic graphite. In some embodiments, synthetic graphite can include a graphite formed from heating an organic precursor to a temperature of about 3000° C. or higher. For example, a synthetic graphite may include graphite formed from heating petroleum coke and/or coal-tar pitch to a temperature of about 3000° C. or higher.

A lithium ion capacitor comprising two or more lithium ion intercalating carbon components may have improved electrical performance, including for example, decreased equivalent series resistance (ESR), reduced capacitance fade after a number of charge-discharge cycles, increased power density, and/or increased energy density. A lithium ion capacitor having such a configuration may not include a conductive additive, such as a conductive carbon additive. In some embodiments, a lithium ion capacitor having such a configuration can be fabricated at a lower cost. For example, replacement of a quantity of hard carbon with a soft carbon and/or graphite may reduce costs of fabricating the lithium ion capacitor.

It will be understood that although the electrodes and energy storage devices herein may be described within a context of lithium ion capacitors, the embodiments can be implemented with any of a number of energy storage devices and systems, such as one or more batteries, capacitors, capacitor-battery hybrids, fuel cells, combinations thereof, and the like.

FIG. 1 shows a side cross-sectional schematic view of an example of an energy storage device 100. The energy storage device 100 may be a lithium ion capacitor. Of course, it should be realized that other energy storage devices are within the scope of the invention, and can include batteries, capacitor-battery hybrids, and/or fuel cells. The energy storage device 100 can have a first electrode 102, a second electrode 104, and a separator 106 positioned between the first electrode 102 and second electrode 104. For example, the first electrode 102 and the second electrode 104 may be placed adjacent to respective opposing surfaces of the separator 106. The first electrode 102 may comprise a cathode and the second electrode 104 may comprise an anode, or vice versa. The energy storage device 100 may include an electrolyte to facilitate ionic communication between the electrodes 102, 104 of the energy storage device 100. For example, the electrolyte may be in contact with the first electrode 102, the second electrode 104 and the separator 106. The electrolyte, the first electrode 102, the second electrode 104, and the separator 106 may be received within an energy storage device housing 120. For example, the energy storage device housing 120 may be sealed subsequent to insertion of the first electrode 102, the second electrode 104 and the separator 106, and impregnation of the energy storage device 100 with the electrolyte, such that the first electrode 102, the second electrode 104, the separator 106, and the electrolyte may be physically sealed from an environment external to the housing.

The separator 106 can be configured to electrically insulate two electrodes adjacent to opposing sides of the separator 106, such as the first electrode 102 and the second electrode 104, while permitting ionic communication between the two adjacent electrodes. The separator 106 can comprise a variety of porous electrically insulating materials. In some embodiments, the separator 106 can comprise a polymeric material. For example, the separator 106 can comprise a cellulosic material (e.g., paper), a polyethylene (PE) material, a polypropylene (PP) material, and/or a polyethylene and polypropylene material.

The energy storage device 100 can include any of a number of different types of electrolyte. For example, device 100 can include a lithium ion capacitor electrolyte, which can include a lithium source, such as a lithium salt, and a solvent, such as an organic solvent. In some embodiments, a lithium salt can include hexafluorophosphate ($LiPF_6$), lithium tetrafluoroborate ($LiBF_4$), lithium perchlorate ($LiClO_4$), lithium bis(trifluoromethansulfonyl)imide ($LiN(SO_2CF_3)_2$), lithium trifluoromethansulfonate ($LiSO_3CF_3$), combinations thereof, and/or the like. In some embodiments, a lithium ion capacitor electrolyte solvent can include one or more ethers and/or esters. For example, a lithium ion capacitor electrolyte solvent may comprise ethylene carbonate (EC), dimethyl carbonate (DMC), diethyl carbonate (DEC), ethyl methyl carbonate (EMC), vinyl carbonate (VC), propylene carbonate (PC), combinations thereof, and/or the like. For example, the electrolyte may comprise $LiPF_6$, ethylene carbonate, propylene carbonate and diethyl carbonate.

As shown in FIG. 1, the first electrode 102 and the second electrode 104 include a first current collector 108, and a second current collector 110, respectively. The first current collector 108 and the second current collector 110 may facilitate electrical coupling between the corresponding electrode and an external circuit (not shown). The first current collector 108 and/or the second current collector 110 can comprise one or more electrically conductive materials, and/or have various shapes and/or sizes configured to facilitate transfer of electrical charges between the corresponding electrode and a terminal for coupling the energy storage device 100 with an external terminal, including an external electrical circuit. For example, a current collector can include a metallic material, such as a material comprising aluminum, nickel, copper, silver, alloys thereof, and/or the like. For example, the first current collector 108 and/or the second current collector 110 can comprise an aluminum foil having a rectangular or substantially rectangular shape and can be dimensioned to provide desired transfer of electrical charges between the corresponding electrode and an external electrical circuit (e.g., via a current collector plate and/or another energy storage device component configured to provide electrical communication between the electrodes and the external electrical circuit).

The first electrode 102 may have a first electrode film 112 (e.g., an upper electrode film) on a first surface of the first current collector 108 (e.g., on a top surface of the first current collector 108) and a second electrode film 114 (e.g., a lower electrode film) on a second opposing surface of the first current collector 108 (e.g., on a bottom surface of the first current collector 108). Similarly, the second electrode 104 may have a first electrode film 116 (e.g., an upper electrode film) on a first surface of the second current collector 110 (e.g., on a top surface of the second current collector 110), and a second electrode film 118 on a second opposing surface of the second current collector 110 (e.g., on a bottom surface of the second current collector 110). For example, the first surface of the second current collector 110 may face the second surface of the first current collector 108, such that the separator 106 is adjacent to the second electrode film 114 of the first electrode 102 and the first electrode film 116 of the second electrode 104.

The electrode films 112, 114, 116 and/or 118 can have a variety of suitable shapes, sizes, and/or thicknesses. For example, the electrode films can have a thickness of about 30 microns (μm) to about 250 microns, including about 100 microns to about 250 microns.

In some embodiments, one or more electrode films described herein can be fabricated using a dry fabrication process. As used herein, a dry fabrication process can refer to a process in which no or substantially no solvents are used in the formation of an electrode film. For example, components of the electrode film may comprise dry particles. The dry particles for forming the electrode film may be combined to provide a dry particles electrode film mixture. In some embodiments, the electrode film may be formed from the dry particles electrode film mixture using the dry fabrication process such that weight percentages of the components of the electrode film and weight percentages of the components of the dry particles electrode film mixture are similar or the same.

In some embodiments, an electrode film mixture for an electrode of a lithium ion capacitor can include one or more fibrillizable binder components. For example, a process for forming an electrode film can include fibrillizing the fibrillizable binder component such that the electrode film comprises fibrillized binder. The binder component may be fibrillized to provide a plurality of fibrils, the fibrils desired mechanical support for one or more other components of the film. For example, a matrix, lattice and/or web of fibrils can be formed to provide desired mechanical structure for the electrode film. For example, a cathode and/or an anode of a lithium ion capacitor can include one or more electrode films comprising one or more fibrillized binder components. In some embodiments, a binder component can include one or more of a variety of suitable fibrillizable polymeric materials, such as polytetrafluoroethylene (PTFE), ultra-high molecular weight polyethylene (UHMWPE), and/or other suitable fibrillizable materials, used alone or in combination.

In some embodiments, an electrode film mixture of a lithium ion capacitor electrode can include one or more additives for improving electrical conductivity of the electrode film formed from the mixture. For example, an electrode film mixture for forming a cathode or an anode electrode film of a lithium ion capacitor can include a conductive carbon component additive, such as conductive carbon black, including various commercially available carbon black materials.

In some embodiments, an electrode film of a cathode of a lithium ion capacitor can comprise an electrode film mixture comprising one or more carbon based electroactive components, including for example a porous carbon material, such as activated carbon. For example, an electrode film of a cathode of a lithium ion capacitor can comprise about 50% to about 99% by weight (e.g., from about 85% to about 90% by weight) of activated carbon, up to about 20% by weight (e.g., including about 0.5% to about 15% by weight, including about 5% to about 10% by weight) of binder material, and up to about 25% (e.g., including about 0.5% to about 10%) by weight of electrical conductivity promoting additive.

In some embodiments, a lithium ion capacitor anode electrode film may advantageously not include a conductive additive. For example, an electrode film mixture for the anode electrode film having two or more lithium ion intercalating carbon components may not include additional conductive additives to achieve desired electrical resistance performances while maintaining desired capacitance, thereby facilitating reduction in a weight and/or a cost of fabricating the capacitor. In some embodiments, an electrode film mixture for an anode of a lithium ion capacitor is free or substantially free of an additive for improving an electrical conductivity of the film. In some embodiments, an electrode film mixture for an anode of a lithium ion capacitor is free or substantially free of a conductive carbon component, such as a conductive carbon black.

In some embodiments, an electrode film of a lithium ion capacitor anode can comprise two or more carbon components configured to intercalate lithium ions. In one embodiment, the first electrode 102 is a lithium ion capacitor cathode, and the second electrode 104 is a lithium ion capacitor anode. In this embodiment, at least one of the first electrode film 116 and the second electrode film 118 of the second electrode 104 may comprise two or more lithium ion intercalating carbon components. For example, at least one of the first electrode film 116 and the second electrode film 118 may comprise hard carbon as a first lithium ion intercalating carbon component, and one or more additional lithium ion intercalating carbon components selected from the group consisting of soft carbon and graphite. In some embodiments, a lithium ion capacitor anode can include a first lithium ion intercalating carbon component and a second lithium ion intercalating carbon component. For example, an electrode film of a lithium ion capacitor anode can include a hard carbon, and a soft carbon or a graphite as lithium ion intercalating carbon components. For example, an anode electrode film can include a hard carbon and a graphite as two lithium ion intercalating carbon components. In some embodiments, an anode electrode film can include a hard carbon and a soft carbon as two lithium ion intercalating carbon components. In some embodiments, an electrode film of a lithium ion capacitor anode can include three carbon components configured to intercalate lithium ions. For example, the electrode film can comprise hard carbon, soft carbon and graphite.

In some embodiments, an electrode film of a lithium ion capacitor anode can comprise about 80 weight % to about 97 weight % of the two or more lithium ion intercalating carbon components, including about 90 weight % to about 97 weight %. In some embodiments, a lithium ion capacitor anode film can include up to about 10 weight % of a binder component, including about 4 weight % to about 10 weight %. In some embodiments, a lithium ion capacitor anode film can include up to about 5 weight % of a conductive additive. As described herein, in some embodiments, an electrode film for an anode of a lithium ion capacitor can be free or substantially free of the conductive additive. In such embodiments, the electrode film can comprise up to about 97 weight % of the two or more lithium ion intercalating carbon components, while the remaining is made up of the binder component. For example, the electrode film may comprise the binder component at about 3 weight % to about 10 weight %, including about 3 weight % to about 5 weight %, or about 5 weight % to about 10 weight %.

A lithium ion capacitor anode electrode film can comprise a mixture having various suitable ratios of the two or more lithium ion intercalating carbon components. An anode electrode film may comprise a mixture comprising a composition of the lithium ion intercalating carbon components configured to facilitate a desired capacitor performance, such as a desired lithium ion capacitor capacitance and/or equivalent series resistance. In some embodiments, the composition can be selected to facilitate desired capacitor energy density performance, and/or life cycle performance.

In some embodiments, the lithium ion intercalating carbon components, in a two lithium ion intercalating carbon component system, may comprise at least about 5% by weight of which is hard carbon, including about 10% or more, including about 5% to about 95%. In some embodiments, the lithium ion intercalating carbon components, in a two lithium ion intercalating carbon component system, may comprise at least about 5% by weight of which is a second lithium ion intercalating carbon component, including about 10% or more, including about 5% to about 95%. For example, a ratio of a first lithium ion intercalating carbon component to a second lithium ion component in a two lithium ion intercalating carbon component system can be about 1:19 to about 19:1, including about 1:9 to about 9:1. In some embodiments, a lithium ion capacitor anode electrode film can include a ratio of hard carbon to a second lithium ion intercalating carbon component at about 1:9 to about 9:1. For example, a lithium ion capacitor anode electrode film can comprise a ratio of hard carbon to graphite of about 1:9 to about 9:1, including about 3:7, about 7:3, or about 1:1. In some embodiments, a lithium ion capacitor anode electrode film can comprise a ratio of hard carbon to soft carbon at a ratio of about 1:9 to about 9:1, including about 3:7, about 7:3, or about 1:1.

In some embodiments, a lithium ion capacitor anode electrode film can comprise hard carbon, soft carbon and graphite as the lithium ion intercalating carbon components. In some embodiments, the lithium ion intercalating carbon components, in a three lithium ion intercalating carbon component system, may comprise at least about 5% by weight of which is the hard carbon, including about 10% or more, or about 5% to about 95%. In some embodiments, the lithium ion intercalating carbon components, in a three lithium ion intercalating carbon component system, may comprise at least about 5% by weight of which is the soft carbon, including about 10% or more, or about 5% to about 95%. In some embodiments, the lithium ion intercalating carbon components, in a three lithium ion intercalating carbon component system, may comprise at least about 5% by weight of which is the graphite, including about 10% or more, or about 5% to about 95%. For example, the remaining lithium ion intercalating carbon components may comprise the soft carbon and graphite at various ratios. For example, the electrode film mixture may comprise a ratio of hard carbon to graphite to soft carbon at about 1:1:1. For example, the electrode film mixture may comprise a ratio of hard carbon to graphite to soft carbon at about 2:9:9, about 1:5:4, or about 3:2:5.

A lithium ion capacitor including two or more lithium ion intercalating carbon components may advantageously demonstrate improved device performance, and/or can be less expensive to manufacture. In some embodiments, an anode comprising three lithium ion intercalating components can facilitate improved capacitor cycling performance, power density performance, energy density performance, and/or equivalent series resistance (ESR) performance, while providing desired processability of the electrode films. Without being limited by any particular theory or mode of operation, in some embodiments, additional lithium ion intercalating carbon components may provide intercalation sites configured to provide a desired combination of lithium ion intercalation sites for facilitating improved capacitor performance. For example, a combination of intercalation site characteristics provided by the two or more lithium ion intercalating carbon components may provide a desired lithium ion intercalation to facilitate increased stability in cycling performance, reduced capacitor ESR, while maintaining desired capacitance performance. The ratio of the lithium ion intercalating components may be selected to provide desired device electrical performance while maintaining desired ease of manufacture of the electrode films. For example, a lithium ion capacitor which includes an anode electrode film having lithium ion intercalating carbon components of which about 30 weight % to about 70 weight % is a hard carbon may provide desired device electrical performance while maintaining desired ease of manufacture of the electrode films.

In some embodiments, a lithium ion capacitor having an anode comprising two or more carbon components configured to intercalate lithium ions can advantageously demonstrate reduced equivalent series resistance (ESR), including for example, about 10% to about 20% reduction in ESR, as compared to lithium ion capacitor having an anode comprising one lithium ion intercalating carbon component (e.g., as compared to a lithium ion capacitor including an anode having a lithium ion intercalating carbon component that is hard carbon). For example, a lithium ion capacitor having an anode comprising hard carbon and soft carbon, and/or hard carbon and graphite, as lithium ion intercalating carbon components can advantageously demonstrate reduced ESR, including for example, up to about 10%, about 15%, and about 20% reduction in ESR. For example, a lithium ion capacitor having an anode comprising hard carbon, graphite and/or soft carbon as lithium ion intercalating carbon components, can advantageously demonstrate reduced ESR, while maintaining desired capacitance. For example, a lithium ion capacitor having an anode comprising hard carbon, graphite, and soft carbon as the three lithium ion intercalating carbon components at a ratio of about 1:1:1 can demonstrate about a 35% decrease in ESR performance.

In some embodiments, a lithium ion capacitor including an anode having two or more lithium ion intercalating carbon components can facilitate increased capacitor energy density performance. For example, a lithium ion capacitor including an anode having two or more lithium ion intercalating carbon components may improve conductivity of the anode while maintaining a desired capacitance. Such improvements in conductivity in turn can reduce the quantity of additive components in the anode used to provide a desired electrical conductivity of the lithium ion capacitor. By reducing the amount of these additives used in the anode, a reduction in capacitor weight and/or increase in capacitor energy density can be realized. In some embodiments, an anode having two or more lithium ion intercalating carbon components can be fabricated without or substantially without an additive component configured to improve electrical conductivity of the lithium ion capacitor, such as without or substantially without a conductive carbon additive component.

In some embodiments, a lithium ion capacitor including an anode having two or more lithium ion intercalating carbon components can demonstrate improved capacitor cycling performance, for example, as compared to a capacitor with an anode having one lithium ion intercalating carbon component, such as hard carbon. A lithium ion capacitor having two or more lithium ion intercalating components can demonstrate reduced voltage swings during charge-discharge cycling, for example providing increased cycling performance stability and/or extending a lifetime of the capacitor. In some embodiments, a lithium ion capacitor having two or more lithium ion intercalating components can demonstrate decreased capacitance fade performance after a number of charge-discharge cycles. For example, the lithium ion capacitor may demonstrate from about 5% to about 20% reduction in capacitance fade performance after a number of charge-discharge cycles, such as after about 2,000 cycles, about 4,000 cycles, and about 6,000 cycles.

Figure 2:
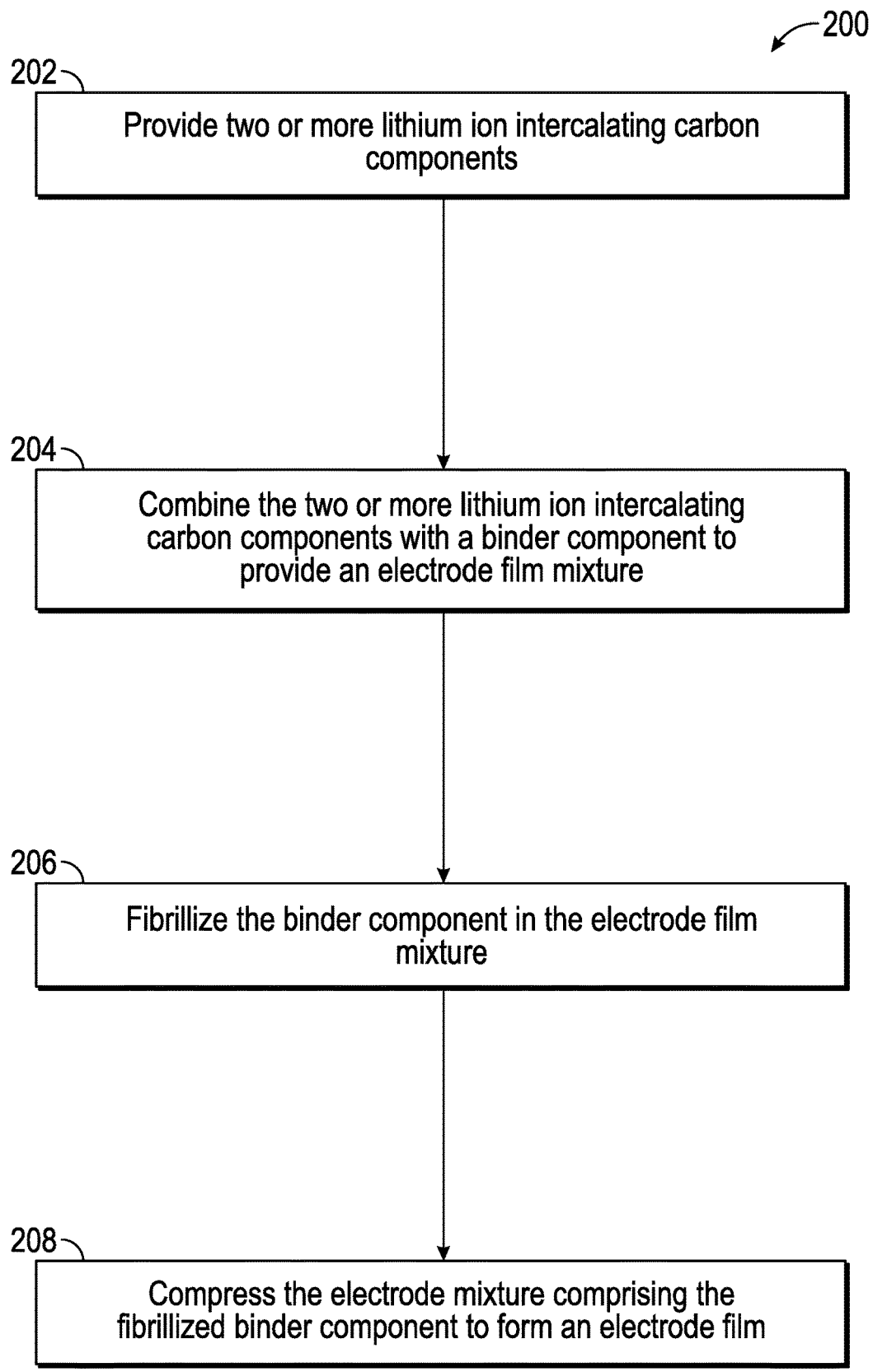
FIG. 2 shows an example of a process for fabricating an anode of an energy storage device.

FIG. 2 shows an example of an electrode fabrication process 200 for preparing an energy storage device electrode, such as one or more of electrode films 112, 114, 116 and 118, of energy storage device 100 as shown in FIG. 1. For example, the electrode fabrication process 200 may be used to form an anode of an energy storage device. In some embodiments, the electrode fabrication process 200 may be used in the formation of electrodes, such as anodes, for a lithium ion capacitor and/or a lithium ion battery. In some embodiments, the fabrication process 200 can comprise a dry fabrication process. For example, the electrode fabrication process 200 can be used to form an electrode comprising a dry particles electrode film.

In block 202, two or more lithium ion intercalating carbon components can be provided. For example, the two or more lithium ion intercalating carbon components can include a hard carbon, and one or more of a soft carbon and a graphite. In some embodiments, two lithium ion intercalating carbon components can be provided. In some embodiments, three ion intercalating carbon components can be provided.

In block 204, the two or more lithium ion intercalating carbon components can be combined with a binder component to provide an electrode film mixture. In some embodiments, one or more additional components can be combined with the lithium ion intercalating carbon components and the binder component to provide the electrode film mixture, such as a conductive additive component. Components of an electrode film mixture may be combined in a mixing apparatus to provide the electrode film mixture. In some embodiments, components of an anode, such as two or more lithium ion intercalating carbon components, a conductive carbon additive and a binder, may be combined in the mixing apparatus to provide an electrode film mixture. In dry processing, for example, components of the electrode film may be blended in the mixing apparatus to form a mixture. In some embodiments, the mixing apparatus may comprise any number of apparatuses configured to provide desired mixing of dry particles. In some embodiments, the electrode film components comprising dry particles can be combined in a mixing apparatus such that a homogeneous or substantially homogeneous dry particles electrode film mixture is provided.

In block 206, the binder component in the electrode film mixture can be fibrillized. For example, the binder component of the anode film mixture comprising the two or more lithium ion intercalating carbon components can be fibrillized. In some embodiments, the electrode film mixture comprising the binder component may be introduced into an apparatus configured to apply a shear force upon the binder material such that the binder material may form the fibrils and/or a web of fibrils under high shear stress. For example, a suitable apparatus for fibrillizing a binder material can include any number of apparatuses configured to apply sufficient shear force upon the binder material, such as a jet-mill, and/or the like. Fibrils, and/or a web of fibrils, can provide a matrix-like structure for supporting one or more other components of the electrode film, such as the lithium ion intercalating carbon components, and/or conductive carbon black. Fibrils formed by the fibrillization process may provide increased structural support to facilitate subsequent formation of a free-standing dry particles film. In some embodiments, fibrillization of the electrode film mixture can be performed in a mixing apparatus, for example, such that mixing the components of the electrode film mixture also fibrillizes the electrode film mixture. For example, blocks 204 and block 206 may be performed as part of the same process. For example, combining components of the electrode film and fibrillization of the binder component of the electrode film may be achieved in a single apparatus configured to both mix the components of the film mixture and fibrillize the binder component of the film mixture. In some embodiments, fibrillization of the binder component can be performed in an apparatus different from the mixing apparatus used to initially mix the electrode film components.

In block 208, the electrode film mixture comprising the fibrillized binder component can be compressed to form a film-like structure. For example, the electrode film mixture comprising the fibrillized binder component can be calendared to form an electrode film. A calendared electrode film may comprise a free-standing or substantially free-standing dry particles film. The calendared electrode film may be attached, such as through a lamination process, onto a current collector. For example, the first electrode film 116 and/or the second electrode film 118 of the second electrode 104 in FIG. 1 may be fabricated using the electrode fabrication process 200. The first electrode film 116 and/or the second electrode film 118 fabricated using the electrode fabrication process 200 may be subsequently attached to the current collector 110 of the second electrode 104 through a calendaring process. In some embodiments, the calendaring can be performed simultaneously or substantially simultaneously as the process for attaching the electrode film to a current collector of the energy storage device.

FIGS. 3 through 10 show various tables and graphs to demonstrate and compare the electrochemical performance of various embodiments of lithium ion capacitors which include an anode fabricated using two or three lithium ion intercalating carbon components at various ratios, relative to each other, and relative to the performance of some devices that have only a single carbon component. Averages for various values shown in the tables and graphs are abbreviated as "Ave." For example, the lithium ion capacitor anodes can be prepared using an electrode film mixture comprising the indicated ratio of the two or three lithium ion intercalating carbon components, one or more conductive carbon additives, and one or more binders. The cathodes of the lithium ion capacitors corresponding to the electrochemical performances shown in FIGS. 3 through 10 can comprise about 85% to about 90% by weight of activated carbon, about 5% to about 10% by weight of a binder component, and about 0.5% to about 10% by weight of electrical conductivity promoting additive, such as carbon black. Electrolytes of reasonably similar performance were used within the various test and control groups of each of FIGS. 3 through 10. The cathodes may be fabricated using a dry fabrication process. For example, cathode electrode film mixtures comprising the above-described compositions can be provided as dry particles mixtures. The binder component in the cathode electrode film mixtures may then be fibrillized, and the cathode electrode film mixtures comprising the fibrillized binder component may be calendared to form a cathode electrode film. In some embodiments, the cathode electrode film may be subsequently attached to a surface of a current collector for the cathode, such as through a lamination process, to form the cathode.

FIG. 3 shows a table listing capacitance, expressed in farads (F), and equivalent series resistance (ESR), expressed in ohms (Ω), performance of lithium ion capacitors having an anode comprising an electrode film mixture comprising hard carbon, and lithium ion capacitors having an anode comprising an electrode film mixture comprising soft carbon and hard carbon at a ratio of about 1:1. The capacitors fabricated using an anode film mixture in which the lithium ion intercalating carbon component comprised only hard carbon demonstrated an average capacitance value of about 17.51 F, and an average equivalent series resistance value of about 0.40Ω. The capacitors fabricated using an anode film mixture comprising a soft carbon and a hard carbon at a ratio of about 1:1 as the lithium ion intercalating carbon components demonstrated an average capacitance value of about 18.58 F and an average equivalent series resistance value of about 0.31Ω. As shown in FIG. 3, the lithium ion capacitors comprising anodes fabricated using an anode film mixture comprising both soft carbon and hard carbon demonstrated desired capacitance values while also demonstrating decreased (and thus improved) ESR performance as compared to the lithium ion capacitors with an anode having only hard carbon. In some embodiments, an improvement in ESR up to about 30% was demonstrated. In some embodiments, a lithium ion capacitor with an anode comprising both soft carbon and hard carbon at a ratio of about 1:1 can demonstrate a decrease in ESR by about 15% to about 30%, including about 20% to about 30%, as compared to a lithium ion capacitor with an anode comprising only hard carbon.

Figure 4B:
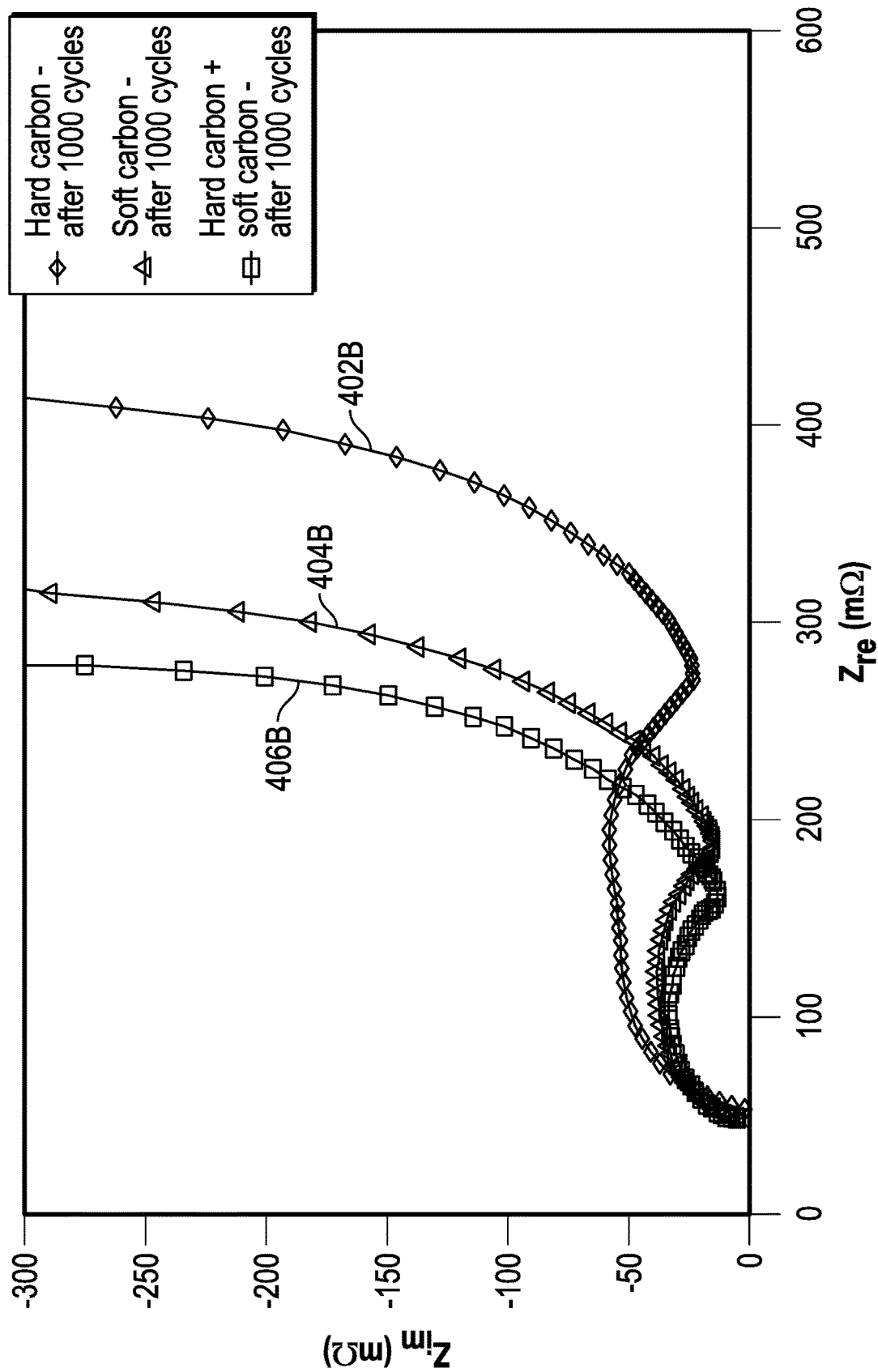

FIGS. 4A and 4B shows electrochemical impedance spectroscopy (EIS) performance curves of various lithium ion capacitors, expressed in milliohms (mΩ), before and after cycling of the lithium ion capacitors. The imaginary component of the impedance value is shown on the y-axis ($Z_{im}$) while the real component of the impedance value is shown on the x-axis ($Z_{re}$). The lithium ion capacitors of FIGS. 4A and 4B were fabricated using anodes comprising anode electrode films comprising only hard carbon, only soft carbon, or both hard carbon and soft carbon. The anodes can be fabricated according to one or more processes described herein. FIG. 4A shows EIS performance curve 402A of a lithium ion capacitor having an anode comprising hard carbon as the lithium ion intercalating carbon component, EIS performance curve 404A of a lithium ion capacitor having an anode comprising soft carbon as the lithium ion intercalating carbon component, and EIS performance curve 406A of a lithium ion capacitor having an anode comprising hard carbon and soft carbon at a ratio of about 1:1 as lithium ion intercalating carbon components, prior to cycling of the respective lithium ion capacitors. As shown in FIG. 4A, lithium ion capacitors corresponding to EIS performance curves 404A and 406A demonstrated lower impedance prior to cycling, as compared to the lithium ion capacitor corresponding to EIS performance curve 402A. For example, the lithium ion capacitors corresponding to EIS performance curves 404A and 406A demonstrated an impedance of about 250 mΩ, while the lithium ion capacitor corresponding to EIS performance curve 402A demonstrated an impedance of about 350 mΩ prior to cycling. A lithium ion capacitor demonstrating a lower impedance prior to cycling can demonstrate a lower equivalent series resistance (ESR).

FIG. 4B shows EIS performance curve 402B of the lithium ion capacitor corresponding to the EIS performance curve 402A, EIS performance curve 404B of the lithium ion capacitor corresponding to the EIS performance curve 404A, and EIS performance curve 406B corresponding to the lithium ion capacitor of EIS curve 406A, after cycling of the respective lithium ion capacitors about 1,000 charge-discharge cycles. In each charge-discharge cycle, the lithium ion capacitors were charged to a voltage of about 4.2 Volts (V) and discharged to a voltage of about 2.2 V, at a temperature of about 20° C. to about 25° C. The lithium-ion capacitors were charged and discharged using a current having a C-rate of about 30 C (a current about 30 times that needed to fully or substantially fully charge or discharge the maximum capacity of the capacitors in about an hour).

As shown in FIG. 4B, the lithium ion capacitor corresponding to electrochemical impedance spectroscopy performance curve 404B, or the capacitor having the anode comprising both hard carbon and soft carbon, was found to have lower impedance after cycling, and therefore can demonstrate lower equivalent series resistance (ESR) after cycling. As shown in FIG. 4B, the lithium ion capacitor corresponding to EIS performance curve 406B demonstrated an impedance of about 250 mΩ, for example demonstrating an impedance comparable to that demonstrated prior to cycling. Meanwhile, the lithium ion capacitor corresponding to EIS performance curve 404B demonstrated an impedance of about 300 mΩ, and the lithium ion capacitor corresponding to EIS performance curve 402B demonstrated an ESR of about 400 mΩ.

Comparing performance of the lithium ion capacitors in FIGS. 4A and 4B, before and after cycling of the capacitors, the lithium ion capacitor comprising both the soft carbon and hard carbon demonstrated reduced overall system resistance and/or a reduced shift in resistance performance. For example, referring to FIG. 4B, the portion of curve 406B corresponding to resistance characteristic of a solid-electrolyte interphase (SEI) can exhibit reduced shift in magnitude and/or shape subsequent to cycling, such as the portion of curve 406B between about 50 mΩ and about 170 mΩ, relative to the corresponding portions of curves 404B and 402B. A reduced shift in magnitude and/or shape of that portion of the curve indicates that a lithium ion capacitor comprising both the soft carbon and hard carbon in an anode can provide a solid-electrolyte interphase (SEI) having improved stability.

Figure 5:
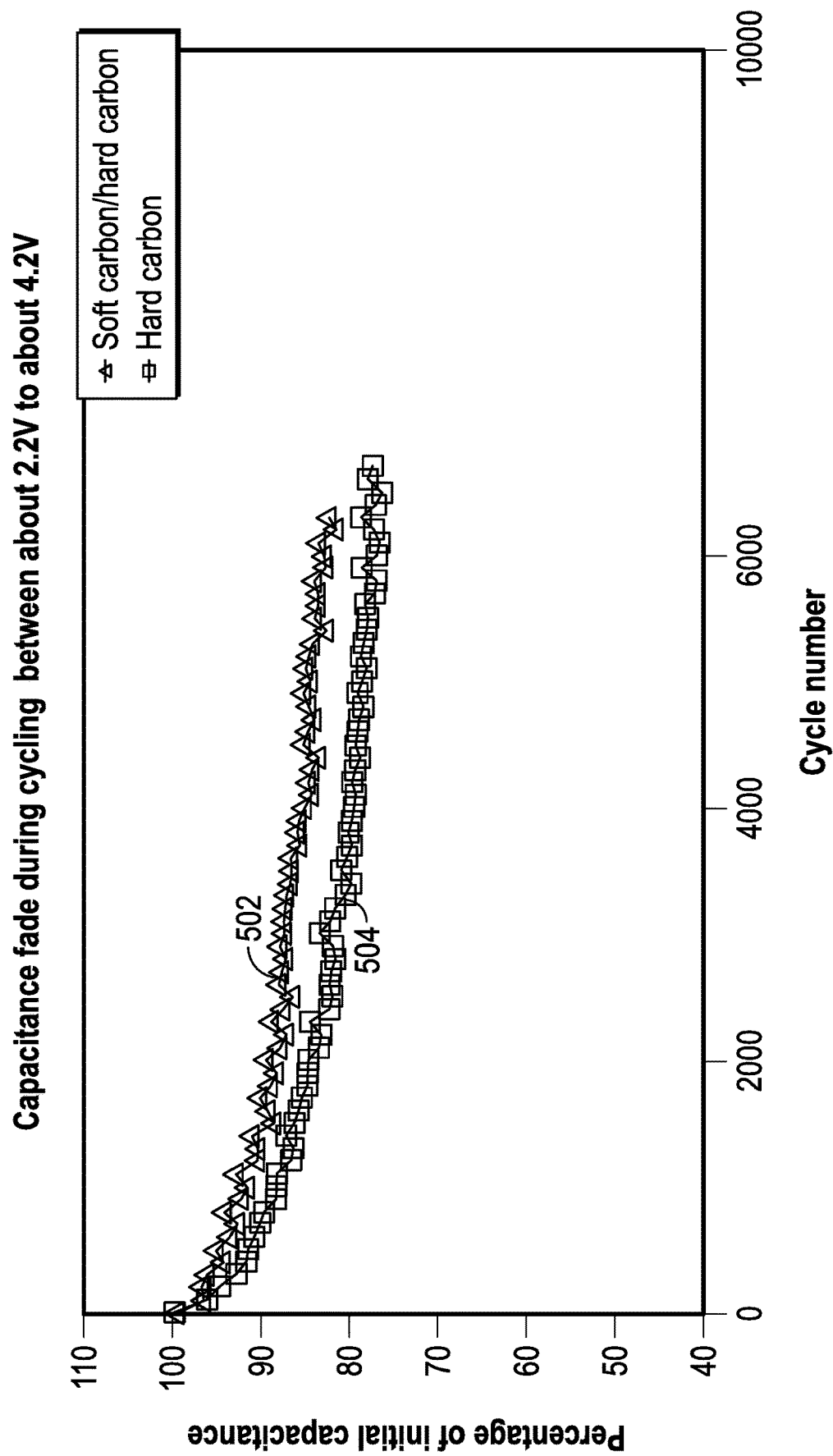
FIG. 5 shows cycling performances of examples of energy storage devices.

FIG. 5 shows cycling performance of two lithium ion capacitors. The graph in FIG. 5 shows on the x-axis the number of cycles, and on the y-axis the capacitance value as a percentage of the initial capacitor capacitance value. The cycling performance curve 502 shown in FIG. 5 corresponds to a lithium ion capacitor having an anode comprising an electrode film mixture having hard carbon and soft carbon as lithium ion intercalating carbon components, and the cycling performance curve 504 corresponds to a lithium ion capacitor having an anode comprising an electrode film mixture having only hard carbon as the lithium ion intercalating carbon component. The ratio of the hard carbon to the soft carbon in the anode of the lithium ion capacitor corresponding to cycling performance curve 502 is about 1:1. In each cycle, the lithium ion capacitors were charged to a voltage of about 4.2 Volts (V) and discharged to a voltage of about 2.2 V, at a temperature of about 20° C. to about 25° C., and at a current having a C-rate of about 30 C. FIG. 5 shows improved life cycle performance by the lithium ion capacitor having the anode comprising hard carbon and soft carbon. The lithium ion capacitor having the anode comprising hard carbon and soft carbon demonstrated a decreased reduction in capacitance value, or capacitance fade performance, after a number of charge and discharge cycles, as compared to the lithium ion capacitor having only hard carbon as the lithium ion intercalating carbon component. For example, the lithium ion capacitor corresponding to cycling performance curve 502 may demonstrate decreased capacitance fade performance after about 2,000 charge-discharge cycles, about 4,000 charge-discharge cycles, and/or after about 6,000 charge-discharge cycles. As demonstrated by the performance test in FIG. 5, in some embodiments, a capacitor having both the hard carbon and soft carbon can provide up to about 5% decrease in capacitance fade after a number of charge-discharge cycles, including after about 4,000 charge-discharge cycles, and after about 6,000 charge-discharge cycles.

FIG. 6 shows a table listing capacitance performance, expressed in farads (F), and equivalent series resistance (ESR) performance, expressed in ohms (Ω), of lithium ion capacitors having an anode comprising an electrode film mixture comprising hard carbon, and lithium ion capacitors having an anode comprising an electrode film mixture comprising hard carbon and graphite at a ratio of about 1:1. The capacitors fabricated using an anode film mixture in which the lithium ion intercalating carbon component comprised only hard carbon demonstrated an average capacitance value of about 16.89 F, and an average equivalent series resistance value of about 0.40Ω. The capacitors fabricated using an anode film mixture comprising a graphite and a hard carbon at a ratio of about 1:1 as the lithium ion intercalating carbon components demonstrated an average capacitance value of about 16.72 F and an average equivalent series resistance value of about 0.36Ω. FIG. 6 shows that lithium ion capacitors having an anode prepared using both hard carbon and graphite can have similar capacitance performance with improved, decreased ESR values, as compared to the lithium ion capacitors having an anode prepared using only hard carbon as the lithium ion intercalating carbon component. As demonstrated by the ESR performance in FIG. 6, in some embodiments, a decrease in ESR can be up to about 15%, including about 10%, and about 12%. For example, a lithium ion capacitor having an anode prepared using two lithium ion intercalating carbon components such as hard carbon and graphite may maintain or substantially maintain desired capacitance value while demonstrating reduced ESR values.

Figure 7:
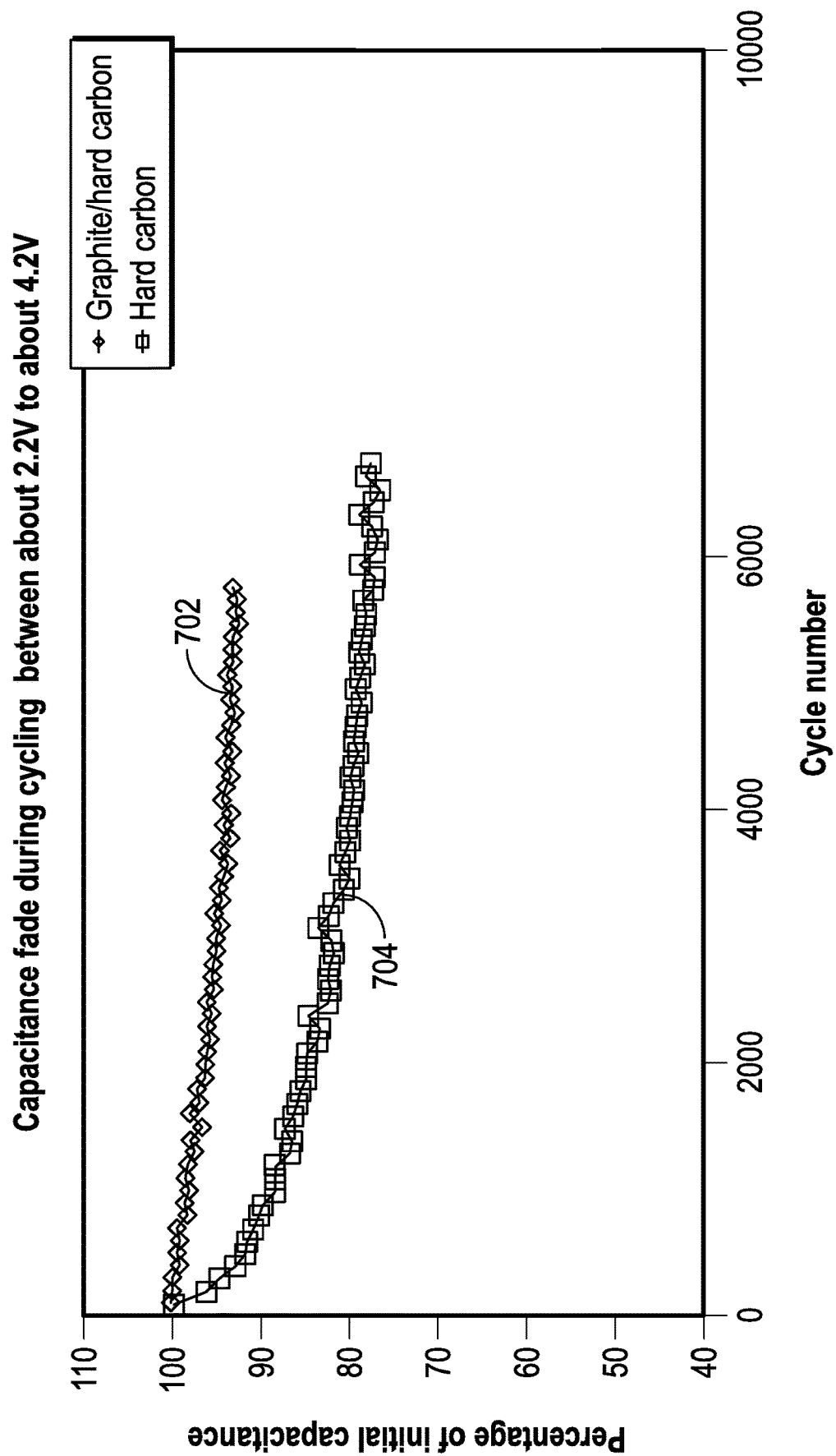
FIG. 7 shows cycling performances of examples of energy storage devices.

FIG. 7 shows cycling performance of two lithium ion capacitors. The graph in FIG. 7 shows on the x-axis the number of cycles, and on the y-axis the capacitance value as a percentage of the initial capacitor capacitance value. The cycling performance curve 702 corresponds to a lithium ion capacitor having an anode comprising an electrode film mixture having hard carbon and graphite as lithium ion intercalating carbon components. The cycling performance curve 704 corresponds to a lithium ion capacitor having an anode comprising an electrode film mixture having only hard carbon as the lithium ion intercalating carbon component. The ratio of the hard carbon to the graphite of the lithium ion capacitor corresponding to cycling performance curve 702 is about 1:1. In each cycle, the lithium ion capacitors were charged to a voltage of about 4.2 Volts (V) and discharged to a voltage of about 2.2 V, at a temperature of about 20° C. to about 25° C., and at a current having a C-rate of about 30 C.

FIG. 7 shows improved life cycle performance of the lithium ion capacitor having the anode comprising both hard carbon and soft carbon, for example demonstrating a decreased capacitance fade performance, expressed as a percentage of the initial capacitance, after a number of charge and discharge cycles. For example, the lithium ion capacitor corresponding to cycling performance curve 702 demonstrates continued decreased capacitance fade (and thus improved capacitor performance) after about 2,000 charge-discharge cycles, about 4,000 charge-discharge cycles, and after 6,000 charge-discharge cycles. Thus, FIG. 7 demonstrates that in some embodiments, a capacitor having both the hard carbon and graphite can demonstrate up to about 10% decrease in capacitance fade after a number of charge-discharge cycles, including after about 2,000 charge-discharge cycles. As demonstrated by the performance test in FIG. 7, in some embodiments, a capacitor having both the hard carbon and graphite can demonstrate up to about 15% decrease in capacitance fade after a number of charge-discharge cycles, including after about 4,000 charge-discharge cycles, and after about 6,000 charge-discharge cycles. Referring to FIGS. 5 and 7, a lithium ion capacitor having an anode comprising both hard carbon and graphite demonstrated increased improvement in capacitance fade performance as compared to a lithium ion capacitor having an anode comprising both hard carbon and soft carbon.

FIG. 8 shows a table listing capacitance performance, expressed in farads (F), and equivalent series resistance (ESR) performance, expressed in ohms (Ω), of lithium ion capacitors having an anode comprising an electrode film mixture comprising only hard carbon as the lithium ion intercalating carbon component, and of lithium ion capacitors having an anode comprising an electrode film mixture comprising soft carbon and hard carbon as the lithium ion intercalating carbon components at a ratio of about 9:1 and at a ratio of about 1:9.

The capacitors comprising an anode film mixture in which the lithium ion intercalating carbon component comprised only hard carbon demonstrated an average capacitance value of about 17.51 F, and an average equivalent series resistance value of about 0.40Ω. Meanwhile, the capacitors fabricated using an anode film mixture comprising a soft carbon and a hard carbon at a ratio of about 9:1 demonstrated an average capacitance value of about 18.61 F and an average equivalent series resistance value of about 0.31Ω. The capacitors fabricated using an anode film mixture comprising a soft carbon and a hard carbon at a ratio of about 1:9 demonstrated an average capacitance value of about 18.46 F and an average equivalent series resistance value of about 0.33Ω.

FIG. 8 shows that lithium ion capacitors having an anode with hard carbon and soft carbon at both ratios of about 1:9 and 9:1 produce decreased ESR performance as compared to the lithium ion capacitors having anodes with only hard carbon as the lithium ion intercalating carbon component, while also demonstrating desired capacitance performance. As shown in FIG. 8, a lithium ion capacitor fabricated using an anode film mixture comprising a soft carbon and a hard carbon at a ratio of about 1:9, or even better, a ratio of 9:1, can demonstrate a lower ESR (and thus improved electrical performance) than that of a capacitor comprising hard carbon only. FIG. 8 shows, for example, an improvement in ESR performance demonstrated by a lithium ion capacitor comprising an anode film mixture comprising a soft carbon and a hard carbon at a ratio of about 9:1, relative to a lithium ion capacitor comprising an anode film mixture comprising only hard carbon, can be up to about 30%, including about 20% to about 30%, or about 25% to about 30%. For example, an improvement in ESR demonstrated by a lithium ion capacitor comprising an anode film mixture comprising a soft carbon and a hard carbon at a ratio of about 1:9, relative to a lithium ion capacitor fabricated using an anode film mixture comprising only hard carbon, can be up to about 20%, including about 10% to about 20%, or about 15% to about 20%.

FIG. 9 shows a table listing capacitance performance, expressed in farads (F), and equivalent series resistance (ESR) performance, expressed in ohms (Ω), of lithium ion capacitors having an anode made from an electrode film mixture comprising only hard carbon as the lithium ion intercalating carbon component, and lithium ion capacitors having an anode made from an electrode film mixture comprising soft carbon and hard carbon at a ratio of about 7:3.

The capacitors fabricated using an anode film mixture in which the lithium ion intercalating carbon component comprised only hard carbon demonstrated an average capacitance value of about 17.51 F, and an average equivalent series resistance value of about 0.40Ω. The capacitors fabricated using an anode film mixture comprising a soft carbon and a hard carbon at a ratio of about 7:3 as the lithium ion intercalating carbon components demonstrated an average capacitance value of about 18.21 F and an average equivalent series resistance value of about 0.33Ω. FIG. 9 demonstrates that lithium ion capacitors having an anode with soft carbon and hard carbon at a ratio of about 7:3 would produce decreased ESR (and thus improved capacitor performance) as compared to the lithium ion capacitors having anodes with only hard carbon as the lithium ion intercalating carbon component. FIG. 9 illustrates, for example, such an improvement in ESR can be up to about 20%, including about 10% to about 20%, including about 15% to about 20%, such as about 17%.

FIG. 10 shows a table listing capacitance performance, expressed in farads (F), and equivalent series resistance (ESR) performance, expressed in ohms (Ω), of lithium ion capacitors having an anode made from an electrode film mixture comprising only hard carbon as the lithium ion intercalating carbon component, and lithium ion capacitors having an anode made from an electrode film mixture comprising hard carbon, soft carbon and graphite at a ratio of about 1:1:1.

The capacitors fabricated using an anode film mixture in which the lithium ion intercalating carbon component comprised only hard carbon demonstrated an average capacitance value of about 16.58 F, and an average equivalent series resistance value of about 0.52Ω. The capacitors fabricated using an anode film mixture comprising a hard carbon, a soft carbon and a graphite at a ratio of about 1:1:1 as the lithium ion intercalating carbon components demonstrated an average capacitance value of about 18.02 F and an average equivalent series resistance value of about 0.35Ω. FIG. 10 shows that lithium ion capacitors having an anode with hard carbon, soft carbon and graphite at a ratio of about 1:1:1 would produce decreased ESR (and thus improved capacitor performance) as compared to the lithium ion capacitors having anodes with only hard carbon as the lithium ion intercalating carbon component. For example, an improvement in ESR can be up to about 35%, including about 10% to about 35%, or about 25% to about 35%.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Thus, it is intended that the scope of the invention herein disclosed should not be limited by the particular embodiments described above.

The headings provided herein, if any, are for convenience only and do not necessarily affect the scope or meaning of the devices and methods disclosed herein.

What is claimed is:

1. An energy storage device, comprising:
   a cathode;
   an anode comprising a dry free-standing electrode film, wherein the electrode film comprises a first lithium ion intercalating carbon component and a second lithium ion intercalating carbon component; and
   a separator between the anode and the cathode.

2. The energy storage device of claim 1, wherein the energy storage device comprises a lithium ion battery.

3. The energy storage device of claim 1, wherein the first lithium ion intercalating carbon component comprises a hard carbon.

4. The energy storage device of claim 3, wherein the second lithium ion intercalating carbon component comprises a soft carbon or a graphite.

5. The energy storage device of claim 4, wherein the electrode film further comprises a third lithium ion intercalating carbon component, wherein the third lithium ion intercalating component comprises the other of the soft carbon or the graphite.

6. The energy storage device of claim 1, wherein the electrode film comprises the first lithium ion intercalating carbon component and the second lithium ion intercalating carbon component at a ratio of 1:19 to 19:1.

7. The energy storage device of claim 6, wherein the ratio of the first lithium ion intercalating carbon component and the second lithium ion intercalating carbon component is 1:1.

8. The energy storage device of claim 1, wherein the electrode film further comprises a conductive additive configured to improve electrical conductivity of the energy storage device.

9. The energy storage device of claim 1, wherein the electrode film comprises 80 weight % to 97 weight % of the first lithium ion intercalating carbon component and the second lithium ion intercalating carbon component.

10. The energy storage device of claim 1, wherein the electrode film comprises a lithium ion battery active material.

11. A dry anode electrode film of an energy storage device, comprising a first lithium ion intercalating carbon component and a second lithium ion intercalating carbon component, wherein the anode electrode film is a dry free-standing electrode film.

12. The anode electrode film of claim 11, wherein the anode electrode film comprises a lithium ion capacitor active material.

13. The anode electrode film of claim 11, wherein the first lithium ion intercalating carbon component comprises a hard carbon.

14. The anode electrode film of claim 13, wherein the second lithium ion intercalating carbon component comprises soft carbon or graphite.

15. The anode electrode film of claim 11, further comprising a third lithium ion intercalating carbon component.

16. The anode electrode film of claim 11, wherein the anode comprises the first lithium ion intercalating carbon component and the second lithium ion intercalating carbon component at a ratio of 1:19 to 19:1.

17. The anode electrode film of claim 11, wherein the anode comprises 80 weight % to 97 weight % of the first lithium ion intercalating carbon component and the second lithium ion intercalating carbon component.

18. A method of fabricating a dry free-standing electrode film, comprising:
providing a dry first lithium ion intercalating carbon component;
providing a dry second lithium ion intercalating carbon component;
providing a dry fibrillizable binder component;
combining the dry fibrillizable binder component, the dry first lithium ion intercalating carbon component and the dry second lithium ion intercalating carbon component to form a dry electrode film mixture; and
forming a dry free-standing electrode film from the dry electrode film mixture.

19. The method of claim 18, wherein the dry first lithium ion intercalating carbon component comprises hard carbon and the dry second lithium ion intercalating carbon component comprises a soft carbon or a graphite.

20. The method of claim 19, wherein the dry second lithium ion intercalating carbon component comprises the soft carbon and the dry electrode film mixture comprises the hard carbon and the soft carbon at a ratio of 1:1.

21. The method of claim 20, further comprising providing a dry third lithium ion intercalating carbon component and combining the dry third lithium ion intercalating carbon component, the dry fibrillizable binder component, the dry first lithium ion intercalating carbon component and the dry second lithium ion intercalating carbon component to form the dry electrode film mixture, wherein the dry third lithium ion intercalating carbon component comprises a graphite.

22. The method of claim 21, wherein the dry electrode film mixture comprises 80 weight % to 97 weight % of the dry first lithium ion intercalating carbon component, the dry second lithium ion intercalating carbon component and the dry third lithium ion intercalating carbon component.

23. The method of claim 18, further comprising fibrillizing the dry fibrillizable binder component such that at least a portion of the dry fibrillizable binder component comprises a dry fibrillized binder component.

24. The method of claim 23, wherein forming the dry free-standing electrode film comprises compressing the dry electrode film mixture.

25. The method of claim 18, further comprising providing a dry conductive carbon component and combining the dry conductive carbon component with the dry fibrillizable binder component, the dry first lithium ion intercalating carbon component and the dry second lithium ion intercalating carbon component to form the dry electrode film mixture.

26. A method of fabricating an anode, comprising attaching the dry free-standing electrode film of claim 18 to a current collector.

27. A method of fabricating an energy storage device comprising:
providing a housing;
providing a cathode;
providing the anode of claim 26;
providing a separator; and
placing the separator between the anode and the cathode within the housing.

28. The energy storage device of claim 1, wherein the dry free-standing electrode film comprises a fibrillized binder matrix providing structural support to the dry free-standing electrode film.

* * * * *